Feb. 27, 1968     W. J. McDONALD ET AL     3,370,676
MINE HOIST SYSTEM INCLUDING A MAIN COUNTER FOR
LEVEL DETERMINATION AND A JOG COUNTER
FOR LEVEL OFFSET
Filed June 15, 1964     13 Sheets-Sheet 1

INVENTORS.
WILLIAM J. McDONALD
EDWARD B. BYNUM, JR.
BY

ATTORNEY

FIG.3
AMPLIFIER
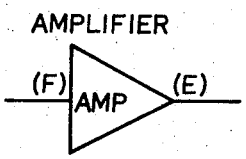
FIG.3A
AND NOT
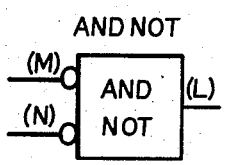
FIG.3B
COUNTER
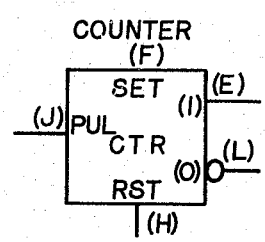
FIG.3C
INVERTER
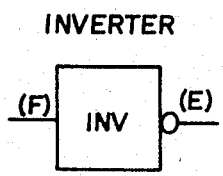
FIG.3D
INVERTING OR
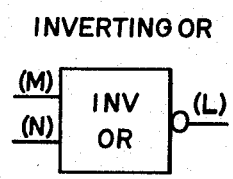
FIG.3E
ONE SHOT
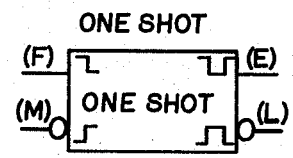
FIG.3F
OR CIRCUIT
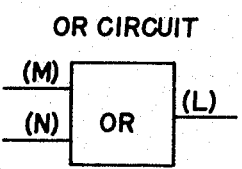
FIG.3G
TIME DELAY
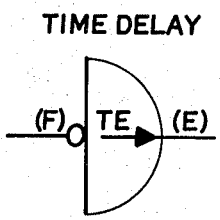
FIG.3H
RELAY COIL
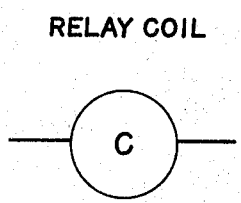
FIG.3I
REV. COUNTER
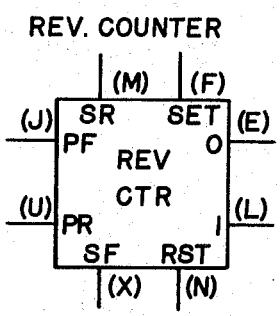
FIG.3J

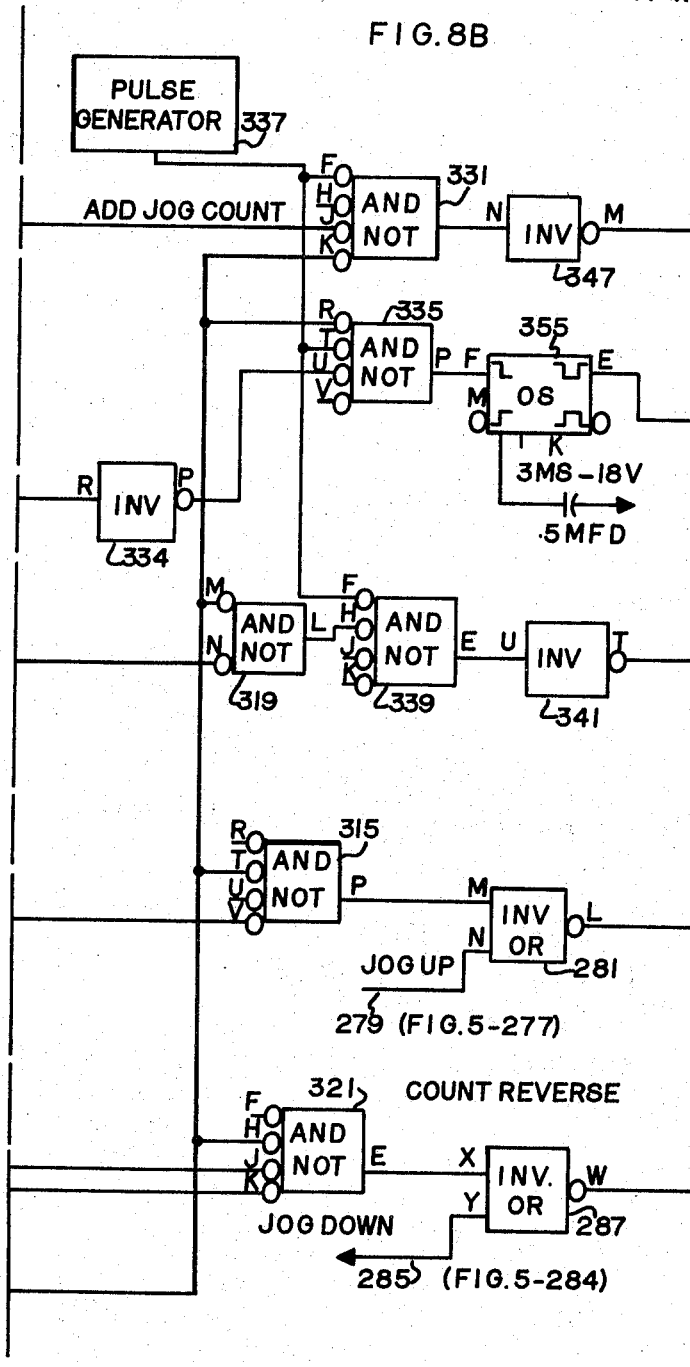

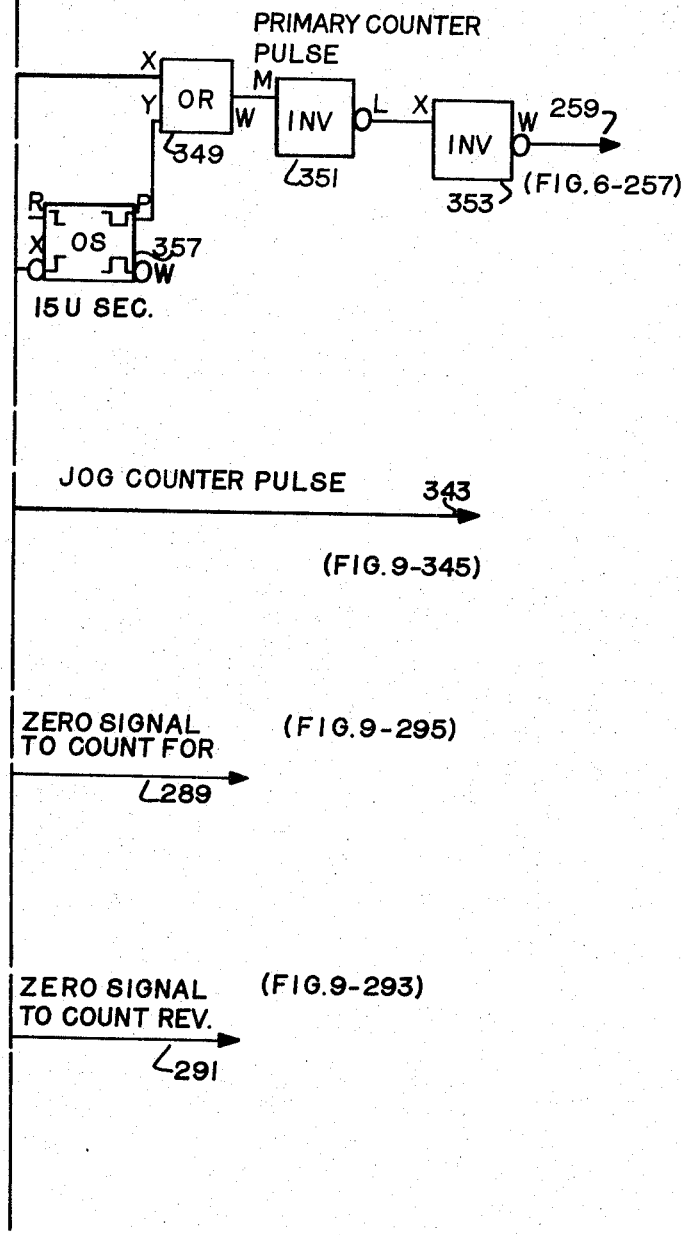

United States Patent Office 3,370,676
Patented Feb. 27, 1968

3,370,676
MINE HOIST SYSTEM INCLUDING A MAIN COUNTER FOR LEVEL DETERMINATION AND A JOG COUNTER FOR LEVEL OFFSET
William J. McDonald, Schenectady, N.Y., and Edward B. Bynum, Jr., Roanoke, Va., assignors to General Electric Company, a corporation of New York
Filed June 15, 1964, Ser. No. 374,926
4 Claims. (Cl. 187—29)

ABSTRACT OF THE DISCLOSURE

For regulating cage movement in a multi-level shaft where the cage may initially not be at a regular level, a mine hoist system including a primary counter for storing a count initially proportional to the inter-level distance to be traveled. A jog counter initially contains a count proportional to the distance the cage was jogged from the previous regular level. As the cage travels toward the selected level, the jog count is reduced in proportion to the distance traveled; i.e., at a normal rate. If the cage must pass its previous level, the primary count remains unchanged until the jog count reaches zero. Thereafter, the primary count is reduced at the normal rate. If the cage will not pass its previous level, the primary count is reduced at double the normal rate until the jog count becomes zero. Thereafter, the primary count is reduced at the normal rate. In either case, when the primary count reaches zero the cage should be at the selected level.

---

This invention is directed to a mine hoist system of any type for moving the conveyance between levels in a mine shaft or on a hoisting slope, and more specifically to a mine hoist system for controlling a jogging operation of said system.

Very briefly then, in this invention, a conveyance such as a skip or a cage or skip-cage combination, travels in a mine shaft or on a hoisting slope from one level to another. The trip that a conveyance is to make is selected and the distance between the levels is entered into a primary counter. As the conveyance moves in the shaft toward the selected level, the count in the primary counter is reduced accordingly.

The feature of this invention is that the conveyance may be moved away from a level at which it is resting, without moving the conveyance to another level. This short movement away from a level may be termed a jogging operation, and may be either up or down. The distance that the conveyance moves away from a level during a jogging operation is indicated in a jogging counter. During the next trip of the cage to another level, the distance of the trip between the selected level and the previous level is entered in the primary counter, and the reduction of the count in the primary counter is modified by the count in the jogging counter so that the count in the primary counter indicates the actual distance of the conveyance to the selected level.

It is therefore an object of this invention to provide a new and improved mine hoist system for controlling a conveyance in a mine shaft or on a hoisting slope.

Another object of this invention is to provide a new and improved mine hoist system for providing a jogging operation for the conveyance in a mine shaft.

Still another object of this invention is to provide a new and improved mine hoist system for taking a prior jogging operation into account during a subsequent movement of the conveyance in a mine shaft.

The invention is set forth with particularity in the appended claims. The principles and characteristics of the invention, as well as other objects and advantages are revealed and discussed through the medium of the illustrative embodiments appearing in the specification and drawings which follow.

Figure 1:
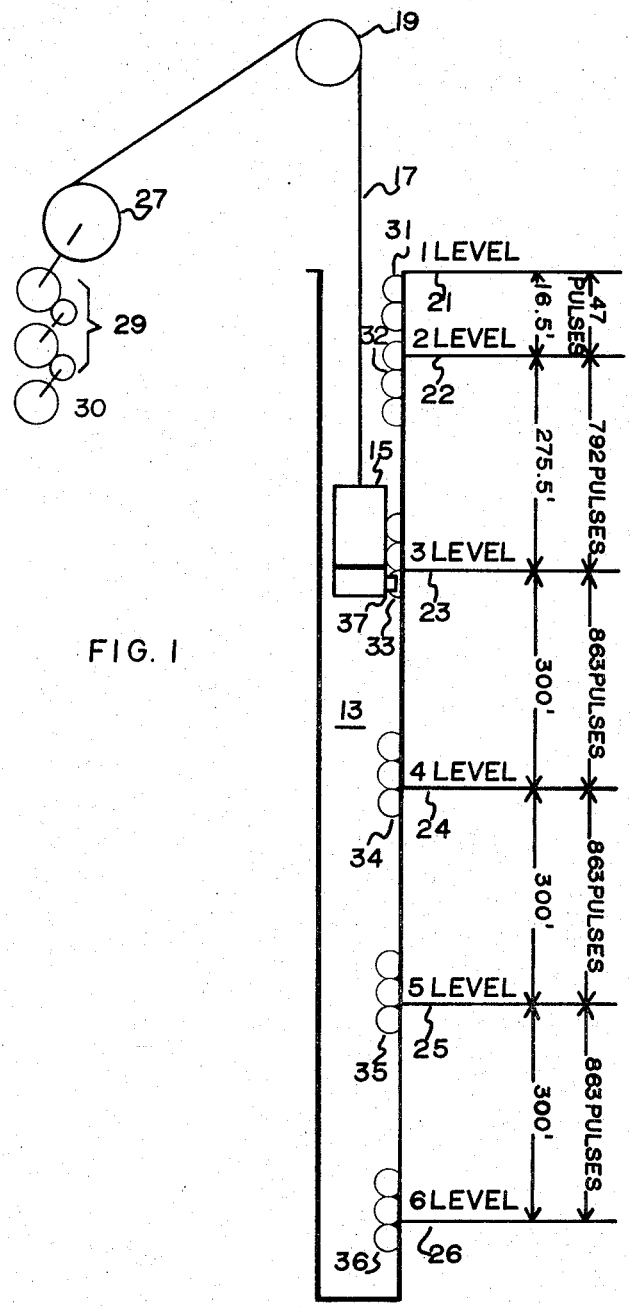
Figure 2:
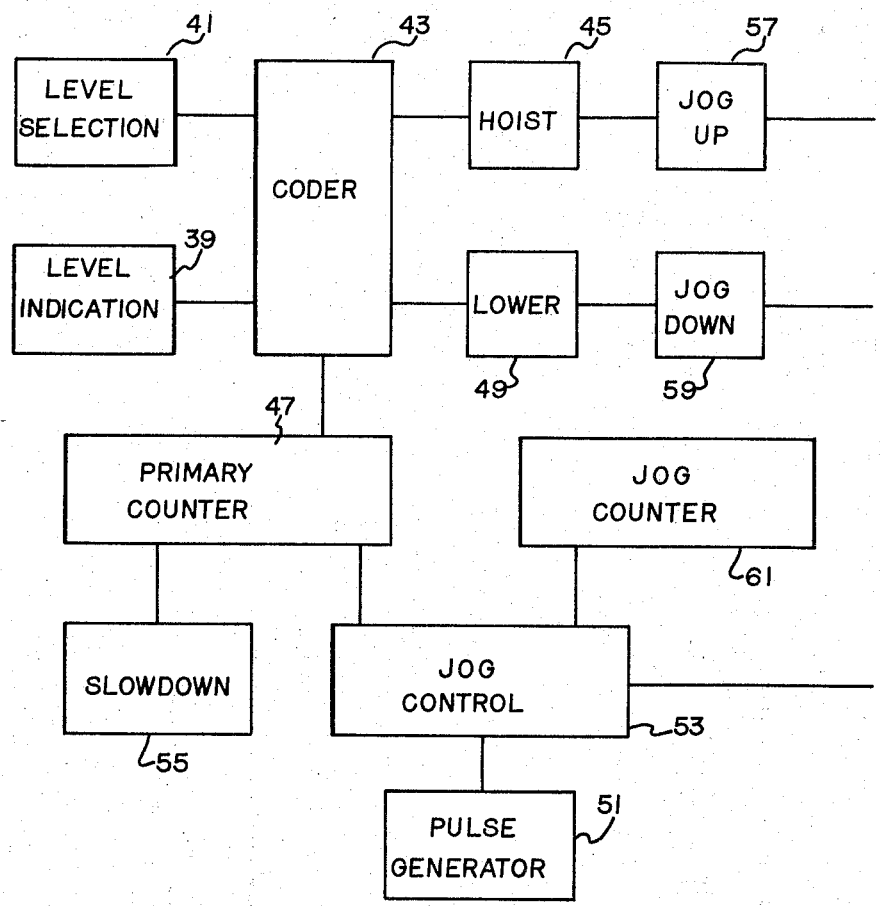
Figure 4:
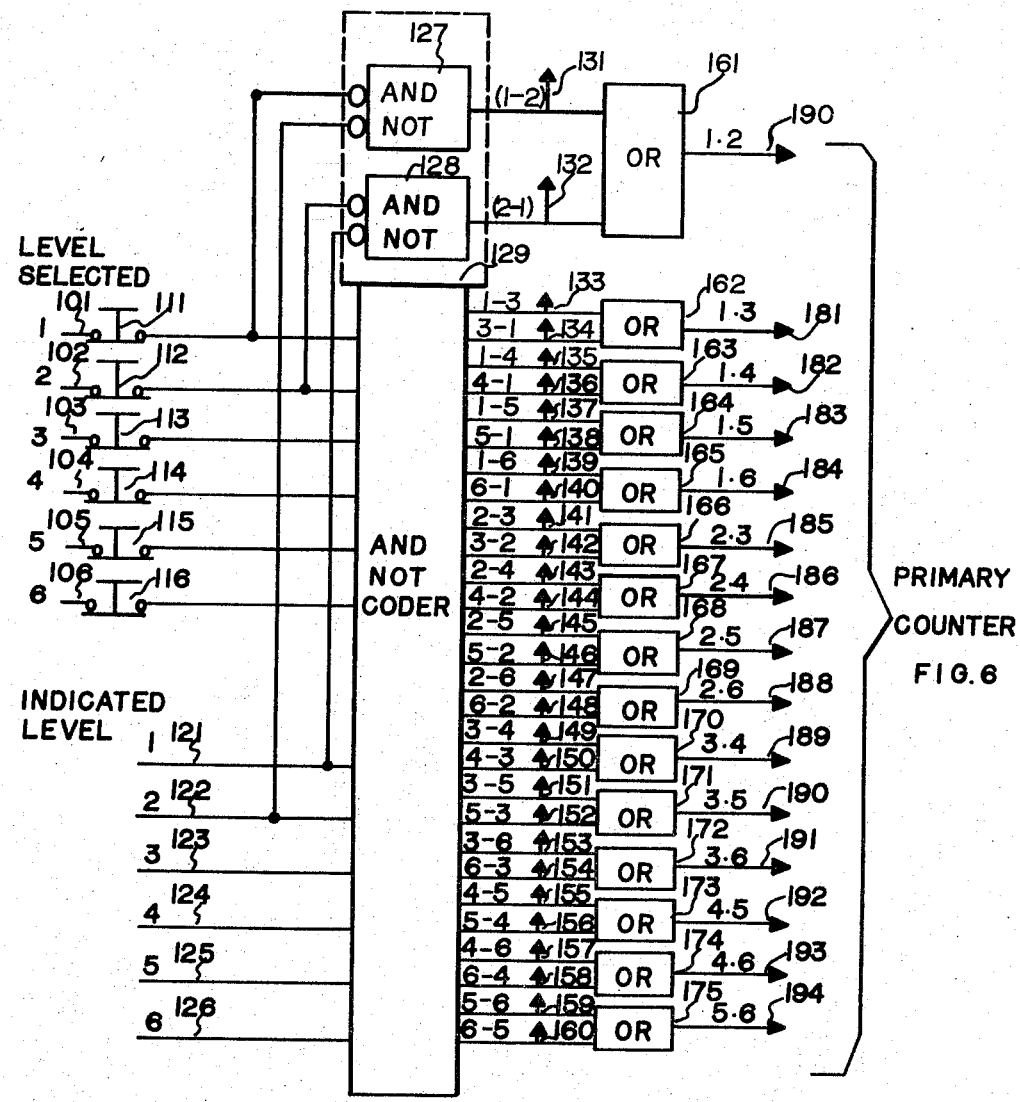
Figure 5:
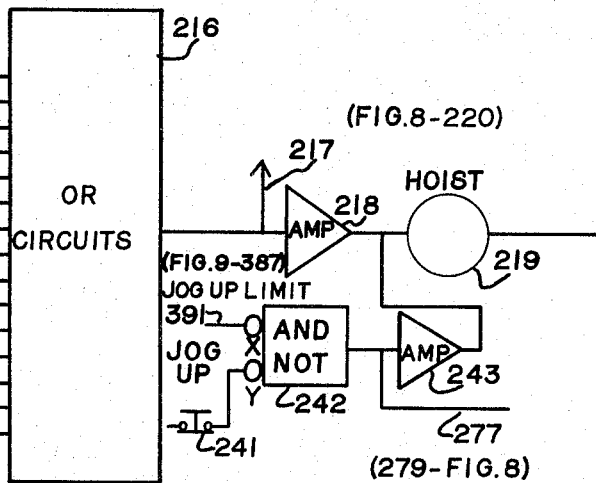
Figure 5:
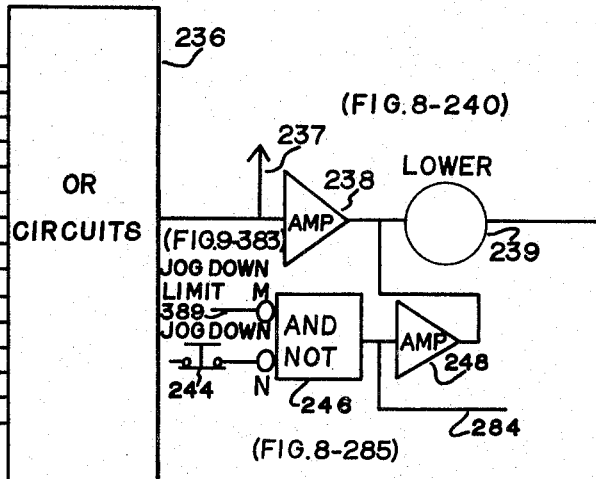
Figure 6:
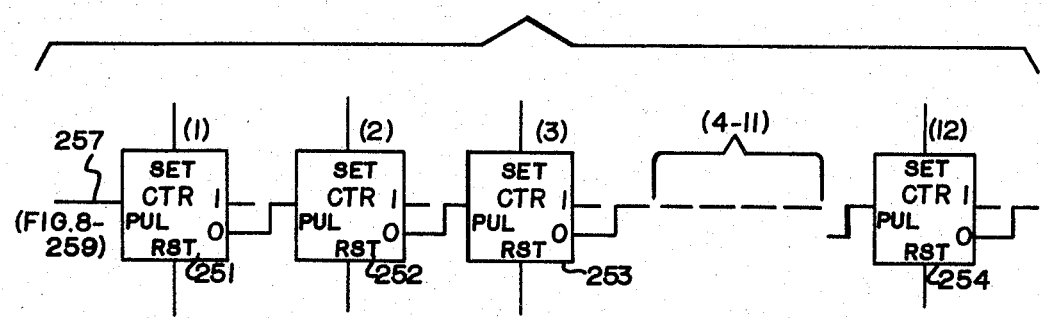
Figure 7:
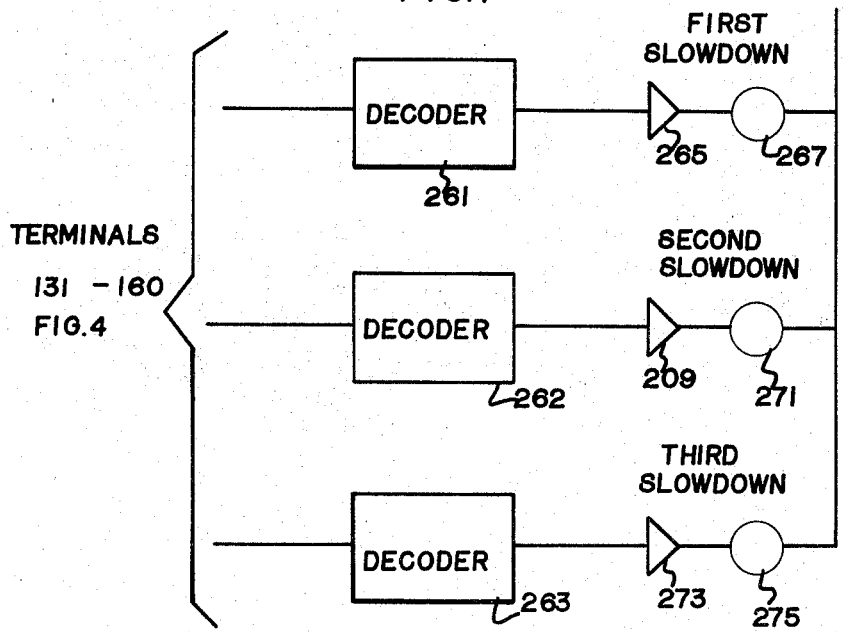
Figure 8:
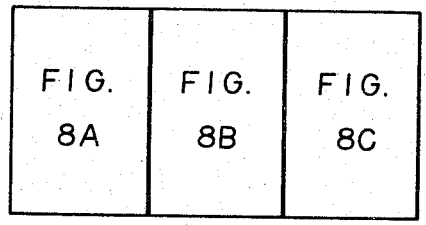
Figure 9:
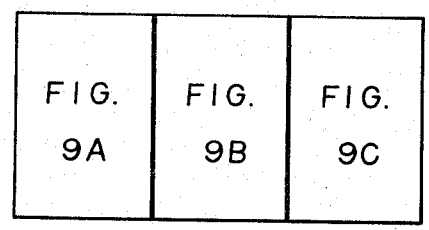
Figure 10:
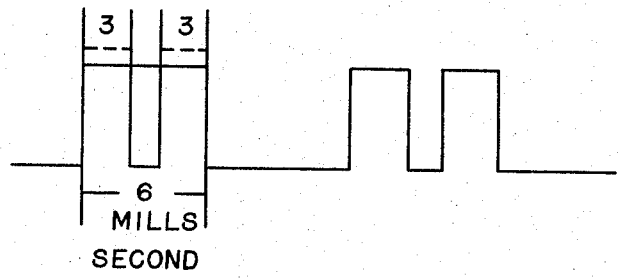
Figure 8A:
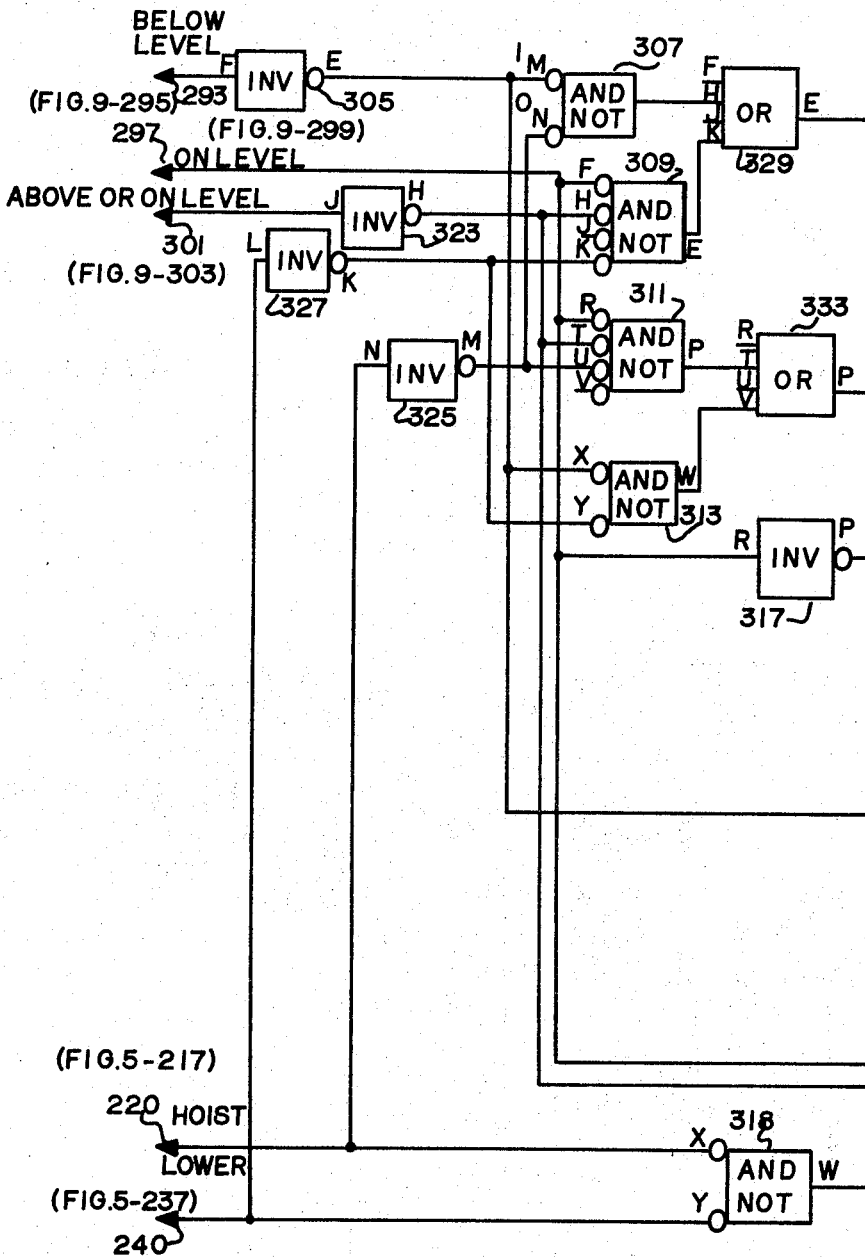
Figure 9A:
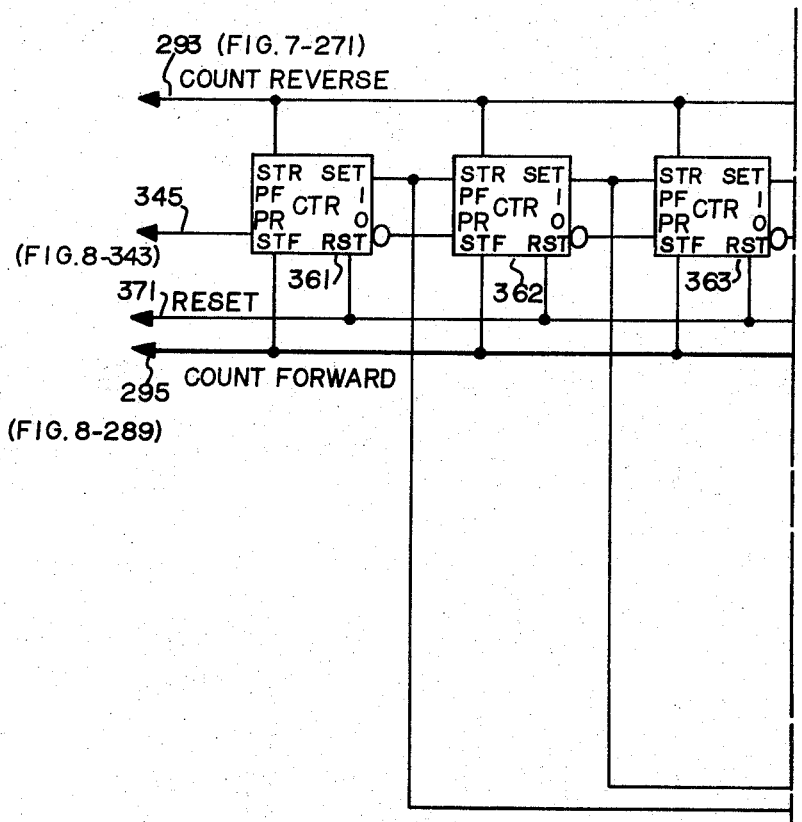
Figure 9B:
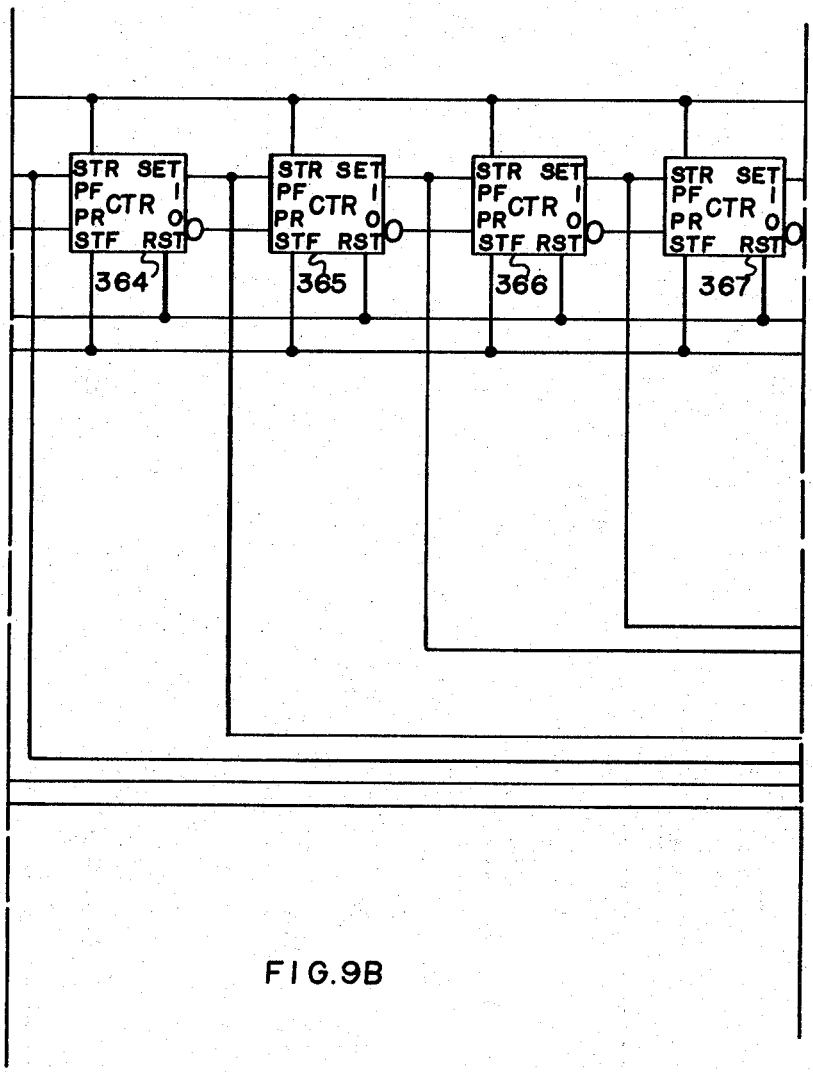
Figure 9C:
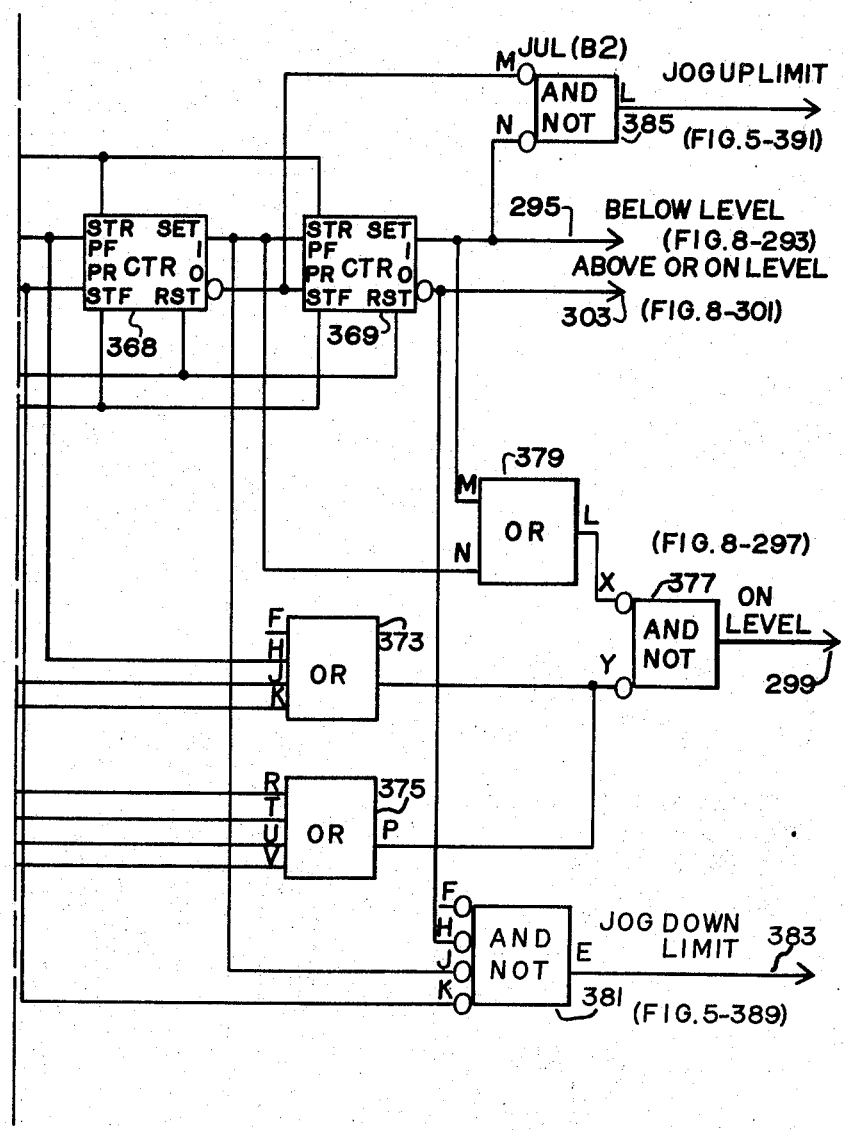

In the drawings:
FIG. 1 shows a schematic of a mine shaft with several levels and a cage.
FIG. 2 shows a block diagram of a control for a mine hoist constructed according to this invention.
FIG. 3a through 3j shows the symbols used in the detailed schematic of the control.
FIG. 4 shows the control for selecting the trip that the cage will take in the mine shaft.
FIG. 5 shows the control for initiating the movement of the cage in the mine shaft.
FIG. 6 shows the primary counter in which the distance of the trip of the cage is stored.
FIG. 7 shows the slowdown control.
FIG. 8 shows the control for the jogging operation.
FIG. 9 shows the jogging counter.
FIG. 10 shows the timing diagram for pulses applied to the primary counter.

Refer now to FIG. 1 for a description of a schematic of a mine hoist. The mine shaft 13 includes six levels 21–26. The levels are separated from each other as indicated. A cage 15 is suspended by a cable 17 from a headsheave 19 in the mine shaft 13. The cage may be moved from one level to another by winding or unwinding the cable 17 about the hoist drum 27. The hoist drum 27 is rotated by motor 30 connected to the hoist drum via gearing 29.

Each level has a magnetic sensor 31–36 positioned at and above each level. A vane of magnetic material 37 is attached to the cage 15 so that it passes through each magnetic sensor 31–36. The control equipment which will be described with relation to FIG. 2 slows the cage down as it approaches a selected level, but does not stop the cage. The sensing of the vane 37 on the cage by a sensor 31–36 after the cage has been slowed down actually initiates creep speed and stops the motor 30 to stop the cage 15 at the sensed level.

Refer now to FIG. 2 for a description of the control equipment for controlling the movement of the cage between different levels. The level at which the cage rests is indicated by the level indication 39 and the selected level to which the cage is to move is indicated by the level selection 41. The level selection 41 and the level indication 39 are connected to the coder 43 to code the combination of the signals indicating the level at which the cage is resting and level to which the cage is to move, providing a trip signal indicating the direction and the specific trip that the cage is to take. The term "trip" indicates between which two levels the cage will move.

If the direction of the trip is upward, a hoist signal is applied to the hoist control 45 to start the motor moving the cage upwards. A signal indicating the specific trip that the cage will take is applied to the primary counter 47 to set the primary counter to a count indicating the distance of the trip. If the direction of the trip is downwards, a lower signal is applied to the lower control 49 to start the motor moving the cage downwards. A signal is also applied to the primary counter 47 to set the primary counter to a count indicating the distance of the trip.

The pulse generator 51 is connected to the hoist motor in such a manner that it generates pulses as the hoist motor moves the cage with a predetermined number of pulses generated for each foot that the cage moves. The pulses generated by pulse generator 51 normally pass through jog control 53 and are applied to primary counter 47.

The primary counter 47 is connected to the slowdown control 55 in such a manner that the slowdown control 55 will slow down the hoist motor when the primary counter 47 has counted down to a predetermined number indicating that the cage is a predetermined distance from the selected level. The slowdown control can be so connected to slow down the hoist motor to a first reduced speed when the cage is a first distance from the selected level to slow down the hoist motor to a second reduced speed when the cage is a second distance from the selected level, and to slow down the hoist motor to a third reduced speed when the cage is a third distance from the selected level. The cage is then traveling at a very slow speed and is finally stopped when one of the magnetic sensors 31–36 in FIG. 1 senses the presence of the vane 37 on the cage 15.

To further understand the invention, assume that the cage is resting at level 1 and is to make a trip to level 6 in FIG. 1. The level indication 39 indicates that the cage is now at level 1 and the level selection 41 indicates that the cage is to travel to level 6. The signals indicating the level the cage is resting at and the level to which the cage is to travel are combined in coder 43 to produce a lower signal which is applied to lower control 49 and to produce a trip signal indicating that the cage is to travel from level 1 to level 6.

The lower signal applied to the lower control 49 causes the lower control to start the movement of the cage downwards. The trip signal (level 1 to level 6) applied to the primary counter 47 sets a count in the primary counter indicating the distance between level 1 and level 6. Looking at FIG. 1, the count set into the primary counter would be 3430. As the hoist motor 30 moves the cage 15 downwards, the pulse generator 51 in FIG. 2 generates pulses in synchronism with the movement of the cage. 2.878 pulses are generated for every foot that the cage moves in the shaft. The pulses generated by pulse generator 51 are passed through jog control 53 in the normal operation that is now being described and applied to primary counter 47 to reduce the count therein. In this manner the count in the primary counter 47 is reduced according to the distance that the cage moves in the shaft.

The cage travels at a relatively high speed from the time it starts its trip until it approaches the selected level at which it is to stop. The slowdown control 55 is connected to the primary counter in such a manner that when the primary counter has counted down to a first predetermined number indicating that the cage is at a first predetermined distance from the selected level, the slowdown control 55 controls the slowdown of the cage to a first slowdown speed slower than the speed at which the cage normally travels. The cage is again slowed down to a second, and then to a third slowdown speed, each of which is slower than the preceding speed as the cage approaches the selected level. The signals may be fed into a rate circuit to provide a linear deceleration.

When the cage 15 in FIG. 1 reaches level 6, the magnetic sensor 36 senses the vane 37 on the cage 15 and stops the motor 30 to stop the cage 15 at level 6.

At times it is desirable to move the cage away from the level at which it is resting. It may be desirable to service the cage or to place an object which is too big for the cage, such as a piece of mine equipment, underneath the cage. The movement of the cage away from the level, either upwards or downwards, is termed "jogging up" or "jogging down," depending on the direction of the movement of the cage from the level at which it is resting. Before the jogging operation is carried out, the cage is first moved to a selected level, and the jogging is carried out from that point.

The jog-up or jog-down movement is initiated from the jog-up control 57 or the jog-down control 59. A signal indicating that a jog-up or a jog-down operation is to be performed is applied to the hoist control 45 or the lower control 49, respectively, starting the cage moving upwards or downwards. The jog-up 57 or jog-down control 59 notifies the jog control 53 that a jog operation has begun, and the direction of that jog operation.

The jog control 53 tells the jog counter 61 to count forward if the cage is jogged upwards from the level and to count in reverse if the cage is jogged downwards from the level. Count forward means counting up from zero, and count reverse means to count down from zero.

As the cage moves, pulses from pulse generator 51 are applied through jog control 53 to the jog counter 61 to register the distance away from the level that the cage moves. During this movement of the cage in the jog operation, no pulses are applied to the primary counter from the jog control 53. As the cage is moved to the next level, the count in the jog counter is then returned to zero.

When the cage is called to another level, the jog movement that the cage has taken away from a level must be taken into account for, otherwise the length of the trip would be inaccurate.

When the cage is called to another level, the countdown of the primary counter is modified to take into account the jog movement away from the level. This modification depends on whether the cage moves past the level from which it was jogged on its trip to the next level or whether the cage moves to the next selected level without passing the level from which it was jogged.

If the cage moves to the next selected level without passing the level from which it was jogged, the cage is already a certain distance away from its prior level and the count in the primary counter 47 represents a greater distance than the cage actually has to travel to reach the selected level. Therefore, the jog control 53 controls the pulses from the pulse generator 51 so that twice the usual number of pulses are applied to the primary counter 47 until the jog counter 61 has been returned to zero. The primary counter 47 is thus reduced twice as fast as it normally is until the jog counter returns to zero. When the jog counter has been reduced to zero, the pulses are applied to the primary counter 47 at the normal rate. By reducing the primary counter at twice its normal rate until the jog counter has returned, the zero, the distance that the cage has been jogged away from a level, is taken into account during the subsequent movement to another level when the movement is made without passing the level at which the cage was at before the jog operation was made.

For instance, assume that the cage is at level 3, that the jog-down control 59 directs the lower control 49 to start lowering the cage in a jog operation, and informs the jog control 53 that a jog-down operation has begun. The cage starts to move downwards, causing pulse generator 51 to generate pulses proportionate to the distance being traveled by the cage. The pulses from pulse generator 51 are passed by the jog control 53 and applied to the jog counter 61. The jog control 53 has informed the jog counter 61 that a jog-down operation is being performed, and to count in reverse. The first pulse applied to the jog counter 61 therefore causes the jog counter 61 to be set to its one's complement, setting the binary counter to all "ONE's." The following pulses will reduce the jog counter further. Assume that the cage is moved for a distance represented by a count of 100 so that the jog counter has been reduced to a binary 110110011.

At this point, the cage rests until it is called to move to another selected level. Assume that the cage is now to move to level 4. A count of 863 is set into the primary counter 47 indicating the distance of the trip that the cage would normally take to travel from level 3 to level 4. However, the cage has already been jogged down a count of 100 away from level 3 towards level 4.

As the cage begins to move towards level 4, pulse generator 51 applies pulses to the jog control 53 which are directly passed to the jog counter 61. The jog counter has informed the jog control that the cage is jogged down from a level, so that the jog control 53 notifies the jog counter to count forward this time, in other words, to count in a manner to return to zero. The pulses applied to the jog counter 61 therefore count up to return the jog counter 61 to zero. The jog control 53 has been notified that the cage is moving away from a level without passing the level, so that the jog control 53 modifies the pulses from the pulse generator 51 to apply two pulses to the primary counter 47 for every one pulse received from the pulse generator 51. When the jog counter 61 has been returned to zero, the jog control 53 applies pulses directly to the primary counter 47 to reduce the count therein at its normal rate. Thus, for the first 100 pulses applied to the jog control 53, 200 pulses are applied to the primary counter 47 to reduce the count in the primary counter to 663. At this point, the cage has moved 100 counts from its original position, which was 100 counts below level 3. After moving 100 counts, the cage is now 200 counts below level 3, so that the count of 663 in the primary counter 47 accurately represents the distance that the cage has to travel to reach level 4.

When the cage has been jogged above a level and then the next trip calls for movement upwards to another level, the operation is similar, except that the jog counter 61 has counted forward and must count in reverse to reach zero. The modification of the pulses applied to the primary counter is carried out in the same manner.

If the cage moves to the next selected level and passes the level from which it has been jogged, the count in the primary counter represents a smaller distance than the cage actually has to travel to reach the selected level. Under these circumstances, the pulses from the pulse generator 51 are not passed by the jog control 53 to the primary counter 47 until the jog counter has returned to zero. When the jog counter has been returned to zero, this is indicated to the jog control which then passes the pulses from the pulse generator 51 to the primary counter 47 to begin the reduction of the count in the primary counter. When the jog counter 61 returns to zero this, of course, indicates that the cage has returned from its jog position to the level it was at before it began to jog.

SYMBOLS AND NOMENCLATURE

In the following detailed description, the term "one signal" when used refers to a —6 volt signal and the term "zero signal" refers to a 0 volt signal or ground potential.

The symbols used in FIGS. 3a through 3j and described hereinafter are used in the detailed description of the identification system.

In all of the elements shown, input terminals are usually shown on the left side of the symbols and output terminals are shown on the right side of the symbols.

Amplifier

FIG. 3a shows the symbol for the amplifier. A one signal on the input terminal will cause current to flow in a load connected between the output terminal and the negative power bus.

AND/NOT circuit

FIG. 3b shows the symbol for the AND/NOT circuit. Its operation is such that a zero signal on all input terminals causes a one signal to be produced on the output terminal. This unit may have two or more input terminals. Positive pulses received on all terminals are effectively the same as zero signals received and cause a one signal to be produced on the output terminal. If a one signal is applied to one or more input terminals, a zero signal is produced on the output terminal.

Counter

FIG. 3c shows the symbol for a counter bit. A one signal applied to the SET terminal sets the counter bit to one, so that a one signal appears at the "1" output terminal and a zero signal at the "0" terminal. This one signal at the "1" output terminal will be maintained after the set signal is removed and remains until a one signal is applied to the RST (reset) terminal, at which time the one signal at the "1" output terminal becomes a zero signal, and a one signal appears at the "0" output terminal. The counter bit will remain in this, the zero state or reset state, until a one signal is again applied to the SET terminal. In addition, a positive pulse received on the PUL input terminal will complement the counter bit, changing the state of the counter bit from the previous state. The shift of the counter bit will occur on the positive going side of the input pulse. The "1" and "0" output terminals are always the inverse of each other unless a one signal is simultaneously applied to the SET and RST (reset) terminal, in which case, a zero output signal will be present on both output terminals.

Inverter

FIG. 3d shows the basic symbol for the inverter. A one signal is produced on the output terminal if a zero signal is received on the input terminal and a zero signal is produced on the output terminal if a one signal is received on the input terminal. The small circle is added to the output terminal to indicate the inverted output signal.

Inverting "OR" circuit

FIG. 3e shows the symbol for the inverting OR circuit. Its operation is such that one or more one signals applied to the input terminals will cause a zero signal to be produced on its output terminal. The small circle is added to the output terminal to indicate the inverted output signal.

One shot pulse generator

FIG. 3f shows the symbol for one shot pulse generator. A negative going pulse or a negative going step change in a DC input to the upper input terminal, or a positive going pulse or a positive going step change in a DC input to the lower input terminal, will cause a pulse to be produced at the upper output terminal with a negative going leading edge and a pulse to be produced at the lower output terminal with a positive going leading edge. Both output pulses are available at the same time with a signal on either or both input terminals. The length in time of the output pulses may be adjusted by the capacitance of a capacitor connected to the one shot pulse generator.

"OR" circuit

FIG. 3g shows a symbol for an OR circuit. Its operation is such that a one signal on either input terminal will produce a one signal on the output terminal. This symbol may have two or more input terminals.

Time delay

FIG. 3h shows the symbol for a time delay element. Its operation is such that a predetermined period of time after a one signal is removed from the input terminal, a one signal will appear on the output terminal.

Relay coil

FIG. 3i shows the symbol used for a coil of a relay. The relay coil is energized by applying a one signal to the coil.

Reversing counter bit

FIG. 3j shows the symbol for the reversing counter bit. The reversing counter bit is similar to the counter bit shown in FIG. 3c and described with relation to that symbol. However, the reversing counter bit has two pulse input terminals, PR (pulse reverse) and PF (pulse forward) and two controlling terminals SR (count in reverse) and SF (count forward). When a zero signal is applied to the SF terminal and a one signal to the SR terminal, the counter bit is only responsive to a positive going signal received on the SF terminal; and when a zero signal is applied to the SR terminal and a one signal to the SF terminal, the counter bit is only responsive to a positive going signal received on the SR terminal. The application of these reversing counter bits is described in the jogging counter shown in FIG. 9.

Referring now to FIG. 4 for a detailed description of the control system, the level at which the cage rests is indicated by applying a zero signal to the appropriate terminal 121–126 for levels 1–6, respectively. One signals are normally applied to terminals 121–126 and to terminals 101–106. Pushbuttons 111–116 may be pushed to select the level to which the cage is to be moved. Terminals 101–106 and 121–126 are connected to AND/NOT coder 129.

AND/NOT coder 129 contains a plurality of AND/NOT circuits such as the two AND/NOTS 127 and 128 shown. Each of the AND/NOTS are connected to a terminal selected from terminals 101–106 and to a terminal selected from terminals 121–126, so that each AND/NOT is connected to one terminal which selects the level to which the cage may be moved and to one terminal which indicates the level at which the cage is. For instance, AND/NOT 127 is connected to terminal 101 (level 1 selection) and to terminal 122 (level 2 indication). AND/NOT 128 is connected to terminal 102 (level 2 selection) and to terminal 121 (level 1 indication). The two terminals that an AND/NOT are connected to indicate the trip that the cage may take from the indicated level to the selected level.

The AND/NOTS in the AND/NOT coder 129, such as AND/NOTS 127 and 128 produce a signal from output terminals 131–160 indicating the trip and the direction of the trip that the cage will take from the indicated level to the selected level. The direction of the trip is indicated by the first appearing numeral indicating the level at which the trip starts and the second appearing numeral indicating the level to which the cage is to move. For instance, the indication 2–1 on terminal 132 indicates that the cage is at level 2 and is to move to level 1.

Two terminals indicating trips between two levels are applied to common OR circuits 161–175, with the OR circuits 161–175 producing signals on terminals 181–194 indicating the trip that a cage will take, without indicating the direction of the trip. For instance, terminal 157 (with an indication of 4–6, indicating movement of the cage from level 4 to level 6) and terminal 158 (with an indication of 6–4, indicating movement of the cage from level 6 to level 4) are both connected to OR 174, which will produce a signal on terminal 193 when a signal is applied on either terminal 157 or 158 indicating a trip between level 4 and level 6 without indicating the direction of the trip.

Referring now to FIG. 5, those terminals in FIG. 4 indicating an upward trip of the cage are connected to terminals 201–215 and those terminals indicating a downward trip of the cage are connected to terminals 221–235. Terminals 201–215 are connected through a plurality of OR circuits, indicated as one block of OR circuits 216, to terminal 217 and through amplifier 218 to a hoist coil 219. Terminal 217 is connected to terminal 220 in FIG. 8. Terminals 221–235 are connected through a plurality of OR circuits, indicated as one block of OR circuits 236, to terminal 237, and through amplifier 238 to a lower coil 239. Terminal 237 is connected to terminal 240 in FIG. 8.

Referring now to FIG. 6, a binary counter is shown which is set to a count indicating the distance to be traveled between the two levels by the cage. The binary counter is a twelve bit binary counter, termed the primary counter, composed of twelve identical counter bits. For the purposes of this description, only the first three and last counter bits 251–254 are shown, with the understanding that the fourth through the eleventh counter bits are identical to those shown. The primary counter is set to a count indicating the distance to be traveled between the two levels by output terminals 180–194. This is accomplished by connecting each output terminal 180–194 to the SET input terminal of each counter bit which should be set to ONE to indicate the distance of the trip. For instance, as shown in Table 1, for the trip between levels 1 and 2, the distance is 16.5 feet, which is represented by a count of 47 taking 2.878 pulses per foot. Therefore, for the trip between level 1 and level 2, output terminal 180 in FIG. 4 applies a signal to the SET terminals of the first, second, third, fourth, and sixth counter bits of the primary counter shown in FIG. 6 to set the primary counter to a count of 47. The other output terminals 180–194 are applied to the SET terminals of the primary counter bits to set the primary counter as shown in Table 1.

TABLE 1.—PRIMARY COUNTER PROGRAM

| Trip selected | Distance | No. Pulses | Counter Bit Set | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| | | | 1 | 2 | 4 | 8 | 16 | 32 | 64 | 128 | 256 | 512 | 1024 | 2,048 |
| 1–2 | 16.5 | 47 | X | X | X | X | | X | | | | | | |
| 2–3 | 275.6 | 792 | | | | X | X | | | | X | X | | |
| 1–3 | 292.0 | 840 | | | | X | | | X | | X | X | | |
| 3–4 | 300.0 | 863 | X | X | X | X | X | | X | | X | X | | |
| 4–5 | 300.0 | 863 | X | X | X | X | X | | X | | X | X | | |
| 5–6 | 300.0 | 863 | X | X | X | X | X | | X | | X | X | | |
| 2–4 | 575.6 | 1,654 | | | X | X | | X | X | | X | X | X | |
| 1–4 | 592.0 | 1,703 | X | X | X | | | X | | X | | X | X | |
| 3–5 | 600.0 | 1,726 | | X | X | X | X | X | | | X | | X | |
| 4–6 | 600.0 | 1,726 | | X | X | X | X | X | | | X | | X | |
| 2–5 | 875.5 | 2,520 | | | | X | X | | X | X | X | | | X |
| 1–5 | 982.0 | 2,567 | X | X | X | | X | | | | X | | | X |
| 3–6 | 900.0 | 2,590 | | X | X | X | X | | | | X | | X | X |
| 2–6 | 1,175.5 | 3,383 | X | X | X | | X | X | X | | X | | X | X |
| 1–6 | 1,192.0 | 3,430 | | X | X | | | X | X | | X | | X | X |
| Slowdown: | | | | | | | | | | | | | | |
| No. 1 SD | 61.45 | 214 | | X | X | | X | | X | X | | | | |
| No. 2 SD | 19.30 | 56 | | | | X | X | X | | | | | | |
| No. 3 SD | 6.65 | 19 | X | X | | | X | | | | | | | |

Pulses/Foot=2.878. Slowdown relays are de-energized when number in counter falls below that shown.

The input to terminal 257 of the primary counter is from terminal 259 in FIG. 7.

The primary counter shown in FIG. 6 is a stepdown counter with the counter counting down one for each pulse applied to terminal 257. The zero terminal of each counter bit is connected to the PUL input terminal of the succeeding counter bit to effect this countdown. For example, assume that counter bits 251–253 are set to ONE, indicating a decimal number 7. The first positive pulse applied to terminal 257 causes counter bit 251 to be reset to ZERO, and counter bits 252 and 253 remain set to ONE, indicating a decimal number six. The next positive pulse applied to terminal 257 causes counter bit 251 to be set to ONE, with the negative signal from its ZERO output terminal going positive to reset counter bit 252 to ZERO. Counter bit 253 remains set to ONE, with the 101 of the three counter bits 251–253 indicating a decimal number five. The countdown continues with a countdown of one for each positive pulse applied to terminal 257.

The ONE and the ZERO output terminals of the counter bits in the primary counter shown in FIG. 6 are connected in a predetermined manner to decoders 261–263 to effect three different slowdowns of the cage during its travel from level to level. The distance and corresponding count for each of the three slowdowns are shown in Table 1. To effect the first slowdown, the ZERO output terminals of the 1, 4, 6, 9, 10, 11, and 12 counter bits and the ONE terminals of the 2, 3, 5, 7, and 8 counter bits are connected to decoder 261. Therefore, when the primary counter has counted down to a count of 214 as indicated in Table 1, decoder 261 produces a signal which is amplified by amplifier 265 to de-energize relay coil 267 to effect the first slowdown.

To effect the second slowdown, the ZERO terminals of the 1, 2, 3, 7, 8, 9, 10, 11, and 12 counter bits and the ONE terminals of the 4, 5, and 6 counter bits are connected to decoder 262. Decoder 262 produces a signal when the inputs indicate a count of 56 in the primary counter which is amplified by amplifier 269 to energize relay coil 271 to effect the second slowdown.

To effect the third slowdown, the ZERO terminals of the 3, 4, 6–12 counter bits and the ONE terminals of the 1, 2, and 5 counter bits are connected to decoder 263. Decoder 263 produces a signal when the input indicates a count of 19 in the primary counter which is amplified by amplifier 273 to deenergize relay coil 275 to effect the third slowdown.

Decoders 261–263 are standard decoders composed of AND/NOT circuits and OR circuits which take the combinary of outputs from the ZERO and ONE output terminals of a counter and produce one output signal when the inputs to the AND/NOT and OR circuits are in predetermined conditions.

FIGS. 8 and 9 show the detailed control for the jog operation. The outputs from inverting OR's 281 and 287 are delivered on output terminals 289 and 291, respectively, to terminals 293 and 295, respectively, in FIG. 8. A signal delivered on output terminal 289 tells the jog counter in FIG. 8 to count forward, and a signal delivered on output terminal 291 tells the jog counter in FIG. 8 to count in reverse.

Terminal 293 is connected to terminal 295 in FIG. 8 and receives a signal when the cage is below a level. Terminal 297 is connected to terminal 299 in FIG. 8 and receives a signal when the cage is at a level. Terminal 301 is connected to terminal 303 in FIG. 8 and receives a signal when the cage is above or at a level. The signal received on terminal 293 is inverted by inverter 305 and applied to terminal M of AND/NOT 307, terminal X of AND/NOT 313, and terminal V of AND/NOT 315. The signal received on terminal 297 is applied to terminal F of AND/NOT 309, terminal J of AND/NOT 321, terminal R of AND/NOT 311, and inverted by inverter 317 and applied to terminal N of AND/NOT 319. The signal received on terminal 301 is inverted by inverter 323 and applied to terminal H of AND/NOT 309, terminal T of AND/NOT 311, and terminal K of AND/NOT 321.

The hoist signal received on terminal 220 is inverted by inverter 325 and applied to terminal U of AND/NOT 311 and terminal N of AND/NOT 307. The lower signal received on terminal 340 is inverted by inverter 327 and applied to terminal K of AND/NOT 309 and terminal Y of AND/NOT 313. The hoist signal received on terminal 220 and the lower signal received on terminal 240 are applied to terminals X and Y, respectively, of AND/NOT 318.

The signals produced by AND/NOT's 307 and 309 are applied through OR 329 to terminal J of AND/NOT 331 to control an add-jog count, and the signals produced by AND/NOT's 311 and 313 are applied through OR 333, inverted by an inverter 334, and applied to terminal U of AND/NOT 335.

The signal produced by AND/NOT 318 is applied to terminal H of AND/NOT 321, terminal T of AND/NOT 315, terminal M of AND/NOT 319, terminal R of AND/NOT 335, and terminal K of AND/NOT 331.

The signal produced by AND/NOT 321 is applied to terminal X of inverting OR 287, and the signal produced by AND/NOT 315 is applied to terminal M of inverting OR 281.

The signal produced by AND/NOT 319 is applied to terminal H of AND/NOT 339.

Pulse generator 337 is connected to the main drive motor to produce 2.878 pulses for every foot that the cage moves in the shaft. This is accomplished by attaching a plurality of vanes to the shaft of the motor which moves through a movement sensing device. The movement sensing device p-n causes the pulse generator to produce one pulse every time it senses a vane. The vanes are attached to the motor shaft in a manner to cause the pulse generator to produce 2.878 pulses for every foot that the motor moves the cage in the shaft.

Pulse generator 337 applies negative pulses to the F terminal of AND/NOT 331, the R terminal of AND/NOT 335, and terminal F of AND/NOT 339.

The signal produced by AND/NOT 339 is inverted by inverter 341 and applied from terminal 343 to terminal 345 in FIG. 8. The pulses applied from terminal 343 are to control the jog counter shown in FIG. 8.

The signal produced by AND/NOT 331 is inverted by inverter 347, passed through OR 349, inverted by inverting OR 351, inverted again by inverting OR 353, and applied from output terminal 259 to terminal 257 of the primary counter shown in FIG. 6. The signal produced from terminal F of AND/NOT 335 is applied to a three millisecond one shot 355, and output terminal E of one shot 355 is applied to terminal X of a 15 microsecond one shot 357. The output terminal P of one shot 357 is applied to terminal Y of OR circuit 349 where it is combined with the signal from inverter 347.

The jog counter shown in FIG. 8 consists of nine reversible counter bits 361–369. A signal may be applied to terminal 371 which is applied to the reset terminal of counter bits 361–369 to reset all of the counter bits to ZERO, resetting the jog counter to ZERO. The input terminal 345 is connected to the PF (pulse forward) and PR (pulse reverse) terminals of the first counter bit 361. The ONE output terminal of each counter bit is connected to the PF (pulse forward) input terminal of the following counter bit, and the ZERO output terminal of each counter bit is connected to the PR (pulse reverse) input terminal of the following counter bit. Input terminal 293 is connected to the steer reverse STR input terminals of the counter bits 361–369 so that a zero signal applied to terminal 293 causes the jog counter to count in reverse. Input terminal 295 is connected to the steer forward STF input terminals of the counter bits 361–369 so that a zero signal applied to terminal 295 causes the jog counter to count forward.

The count forward is carried out in the following manner. Assume that the jog counter has been reset to ZERO, and a zero signal applied to the count forward terminal 295, applying zero signals to the STF terminals of the counter bits 361–369. The first positive pulse applied to terminal 345 is applied to the PF and PR terminals of counter bit 361. Since a one signal is applied to the STR terminal of counter bit 361, the positive pulse applied to the PR terminal has no effect. The positive pulse applied to the PF terminal causes counter bit 361 to be set to ONE, with the counter bits 361–369 now a binary 100000000, for the first pulse. The ONE output terminal E applies a one signal to the PF terminal of counter bit 362. The second pulse applied to terminal 345 resets counter bit 361 to zero, and the ONE output terminal E goes positive, applying a zero signal to terminal PF of counter bit 362, setting counter bit 362 to ONE. Thus, after the second pulse, the counter bits 361–369 are a binary 010000000, a decimal 2. The count continues as in a normal binary counter as described.

The count reverse is carried out in the following manner. Assume a count of a decimal 4, with a binary 001000000 in counter bits 361–369. A zero signal is applied to terminal 293, applying a zero signal to the STR (steer reverse) terminals of counter bits 361–369, and a one signal is applied to terminal 295, applying a one signal to the STF (steer forward) terminals of counter bits 361–369. The first positive pulse applied to terminal 345 is applied to the PF (pulse forward) and PR (pulse reverse) terminals of counter bit 361. Since a one signal is applied to the STF terminal of counter bit 361, the positive pulse applied to the PF terminal has no effect. The positive pulse applied to the PF terminal causes counter bit 361 to be set to ONE, causing the signal from the ZERO output terminal L to go positive, causing counter bit 362 to be set to ONE also. The ZERO output terminal of counter bit 362 goes positive as counter bit 362 is set to ONE, applying a positive signal to the PR terminal of counter bit 363, causing counter bit 363 to be reset to ZERO. Counter bits 361 and 362 have been set to ONE, and counter bit 363 has been reset to ZERO so that the jog counter contains a binary 110000000, or a decimal three after one pulse has been applied to terminal 345. Jog counter has thus acted as a countdown counter, counting in reverse.

The ONE output terminals of the first seven counter bits 361–367 are connected through OR circuits 373 and 375 to terminal Y of AND/NOT 377, and the ONE output terminals of the last two counter bits 378 and 379 are connected through OR circuit 379 to terminal X of AND/NOT 377. The output of AND/NOT 377 is delivered on terminal 299 to terminal 297 in FIG. 7, delivering a one signal when the cage is at a level. This one signal is delivered when all counter bits are reset to ZERO, as they will be when there has been no jog movement of the cage from a level, applying zero signals to both terminals of AND/NOT 377, so that AND/NOT 377 produces a one signal.

When jogging down, the jog counter will count in reverse as the cage moves down. The first positive pulse applied to terminal 345 after a zero signal has been applied to the count reverse terminal 293 will set all of the counter bits to ONE as the first counter bit 361 will be set to one, its ZERO output terminal L will go positive applying a positive signal to the PR terminal of counter bit 362 to set that counter bit to one, and so on with all of the counter bits set to one. The ZERO output terminal of counter bit 367 is connected to terminal K of AND/NOT 381, the ONE output terminal of counter bit 368 is connected to terminal J of AND/NOT 381, and the ZERO output terminal of counter bit 369 is connected to terminal H of AND/NOT 381. Therefore, when the jog counter has counted down 128 counts and counter bit 368 set to one, zero signals are applied to all terminals of AND/NOT 381 causing AND/NOT 381 to produce a one signal indicating that the jog-down limit has been reached, and delivering that signal on output terminal 383 to terminal 389 in FIG. 5. It can also be seen that as long as the cage is jogged below a level, counter bit 369 will remain set to one, so that its ONE output terminal E will deliver a one signal from output terminal 295 to terminal 293 in FIG. 7.

When jogging down, the jog counter will count forward as the cage moves upward. The ZERO output terminal of counter bit 368 is connected to terminal M of AND/NOT 385, and the ONE output terminal of counter bit 369 is connected to terminal N of AND/NOT 385. Thus, when counter bit 368 is set to one, indicating that a count of 128 has been reached, zero signals are applied to both terminals of AND/NOT 385, causing AND/NOT to produce a signal on output terminal 387 which is delivered to terminal 391 in FIG. 5 indicating that the jog-up limit has been reached. Counter bit 369 has its ZERO output terminal L connected to terminal 303 so that a one signal is delivered to terminal 301 in FIG. 7 as long as the jog counter indicates that the cage is above, or on a level.

OPERATION

Movement between levels

Assume for the purposes of this description of the operation that the cage is now at level 6 and is to be moved to level 1. Refer first to FIG. 5. Pushbutton 111 is pushed to select the first level, applying a signal to the AND/NOT coder 129, where it is combined with the signal applied from terminal 126 indicating that the cage is now at level 6. AND/NOT coder 129 produces a one output signal on terminal 140 indicating that the movement of the cage will be from level 6 to level 1. The one signal from terminal 140 is applied to terminal 205 in FIG. 5, passed by OR circuits 216, amplified by amplifier 218 to energize the hoist relay coil 219. The hoist relay coil 219, when energized, starts the hoist motor moving the cage upwards.

The one signal on terminal 140 is also passed through OR 165 and applied from output terminal 184 to the primary counter shown in FIG. 6. As indicated in Table 1, the terminal 184 applies a one signal to the set terminals of the 2, 3, 6, 7, 9, 11 and 12 counter bits of the primary counter to set the primary counter to a decimal count of 3430 to provide for a distance of 1192 feet between the sixth and first levels.

The hoist relay coil 219 has now been energized to raise the cage from the sixth to the first level, and the primary counter in FIG. 6 has been set for a trip of 1192 feet.

The shaft of the hoist motor begins to rotate and the vaned rotor driven by the motor passes through the pulse generator 337, so that the pulse generator 337 produces 2.878 positive pulses for every foot of travel of the cage in the shaft. The positive pulses produced by the pulse generator 337 are applied to terminal F of AND/NOT 331. As a zero signal is applied to the other terminal of AND/NOT 331 at this time, the application of a positive pulse to terminal F causes AND/NOT 331 to produce a negative pulse, which is inverted to a positive pulse by inverter 347, passed by OR 349, inverted to a negative pulse by inverting OR 351, inverted back to a positive pulse by inverting OR 353, and applied from output terminal 259 to terminal 257 in FIG. 6 where the positive pulse is applied to the PUL terminal of counter bit 251 of the primary counter to cause the count of decimal 3430 to be counted down by one to a decimal 3429.

As the hoist motor continues to move the cage upwards, the pulses generated by the pulse generator 337 continue to reduce the count in the primary counter shown in FIG. 6. When the count is reduced to a decimal 214 as shown in Table 1, decoder 261 in FIG. 7 produces a one signal, amplified by amplifier 265, to de-energize the first slowdown relay coil 267. The first slowdown relay coil 267, when de-energized, causes the hoist motor to slow down to a first slow speed. At this point, the cage is still 61.45 feet from the first level as indicated by Table 1.

The cage travels at the first slowdown speed until the count is reduced to a count of 56 as indicated by Table 1, where the decoder 262 is de-energized, producing a one signal, amplified by amplifier 269 to energize the second slowdown relay coil 271. The de-energization of the second slowdown relay coil 271 causes the hoist motor to slow down to a second slowdown speed when it is 19.30 feet from the first level, as indicated by Table 1.

The cage travels at the second slowdown speed until the count is reduced to a count of 19, when the cage is 6.65 feet from the first level, as indicated by Table 1. When the count is 19, the third decoder 263 is energized, producing a one signal, amplified by amplifier 273 to de-energize the third slowdown relay coil 275. The de-energization of the third slowdown relay coil 275 causes the hoist motor to slow down to a third slowdown speed which is almost a creep. The third slowdown speed continues until a magnet-magnetic stop switch at the exact level senses a vane attached to the cage to indicate that the cage is at the first level. The sensing of the vane by the stop switch stops the hoist motor, to stop the cage at the first level.

After the cage has stopped at the first level, the primary counter in FIG. 6 is reset by applying signals to the RST terminals of all of the counter bits.

The cage may now be moved to another level by the pushing of another pushbutton 111–116 in FIG. 4 in the same manner as that described.

*Jog up and jog down*

It is often desirable to move the cage itself after it has reached a level. For instance, objects such as mine tractors may be suspended underneath the cage; and after the cage has reached the desired level, the cage must be moved up a few feet to remove the mine tractor from under the cage and into the level. After the mine tractor has been removed, the distance that the cage has moved from the level must be taken into account when the cage moves to another level.

A jog-up operation will be described first, followed by the description of a jog-down operation.

To initiate a jog-up operation, the jog-up pushbutton 241 in FIG. 5 is pushed, applying a zero signal to terminal Y of AND/NOT 242. The jog-up limit obviously has not been reached so that a zero signal is applied to terminal X of AND/NOT 242. AND/NOT 242 therefore produces a one signal which is amplified by amplifier 243 to energize the hoist relay coil 219 to start the hoist motor to move the cage upwards. The one signal produced by AND/NOT 242 is also delivered on output terminal 277 to terminal 279 in FIG. 8 to indicate that a jog-hoist operation has begun.

Referring now to FIG. 8, as neither a normal hoist nor a normal lower operation are being performed at this time, zero signals are applied to both terminals 220 and 240, applying zero signals to both terminals of AND/NOT 318, so that AND/NOT 318 applies a one signal to terminal H of AND/NOT 321, terminal T of AND/NOT 315, terminal M of AND/NOT 319, terminal R of AND/NOT 335, and terminal K of AND/NOT 331.

AND/NOT's 331, 335, 319, 315, and 321 are thus effectively cut off from taking part in the hoist or lower portion of jog operation. AND/NOT 319, with a one signal applied to its M terminal, applies a zero signal to terminal H of AND/NOT 339. As the hoist motor begins to move the cage, the pulse generator 337 applies positive pulses at the rate of 2.878 pulses per foot to terminal F of AND/NOT 339. AND/NOT 339 therefore produces negative pulses, which are inverted back to positive pulses by inverter 341 and delivered from output terminal 343 to terminal 345 in FIG. 9 where they are applied to the PF and PR terminals of counter bit 361 of the jog counter.

The one signal received on terminal 279 in FIG. 8 indicating that a jog-hoist operation has begun was inverted by inverting OR 281 to a zero signal and delivered on output terminal 289 to terminal 295 in FIG. 9. The zero signal received on terminal 295 is applied to the STF (count forward) terminals of the counter bits 361–369 of the jog counter to enable the jog counter to count forward.

The positive pulses received on terminal 345 and applied to the PF and the PR terminals of counter bit 361 thus cause the jog counter to count the number of pulses as the hoist motor moves the cage upward. The jog counter continues to count the pulse while the cage moves upward. The cage moves upward as long as the jog-up pushbutton is depressed, or until the jog-up limit of 128 pulses is reached. If the hoist is continued until the jog counter has counted 128 pulses, the jog-up terminal in FIG. 9 applies a one signal to terminal 391 in FIG. 5, causing AND/NOT 243 to stop producing a one signal and to de-energize the hoist relay coil 219 to stop the hoist motor and stop the cage.

After the jog-up operation has been completed, the jog-up must be taken into account when the cage makes its next trip to another level. A trip up will first be described, then a trip down will be described.

The level to which the cage is to be moved is selected in the same manner as that described in the description of the normal operation. A count is set in the primary counter shown in FIG. 6 indicating the distance that the trip will take from the present level to the selected level. A signal is passed by OR circuits 216 to energize the hoist relay coil 219 to start the hoist motor moving the cage upwards. The signal from OR circuit 216 is also delivered on output terminal 217 to terminal 220 in FIG. 8.

The one signal received on terminal 220 in FIG. 8 is applied to terminal X of AND/NOT 318, causing AND/NOT 318 to apply a zero signal to AND/NOT's 321, 315, 319, 335, and 331, conditioning those AND/NOT's. The cage is not on level, so a zero signal is received on terminal 297 and applied to terminal J of AND/NOT 321, and to AND/NOT's 309 and 311. The cage is above level, so a one signal is received on terminal 301, inverted to a zero signal by inverter 323, applied to terminal K of AND/NOT 321, and to AND/NOT's 309 and 311. AND/NOT 321 therefore produces a one signal which is inverted by inverting OR 287 to a zero signal and delivered on output terminal 291 to terminal 293 in FIG. 9. In FIG. 9 the zero signal received on terminal 293 is applied to the STR (count reverse) terminals of the counter bits 361–369 of the jog counter so that the jog counter will count in reverse when positive pulses are applied to the PR terminal of the first counter bit 361. The jog counter has counted up as the cage was moved up above the level, and now must count back down to zero.

Terminal M of AND/NOT 307 has a one signal applied thereto as the one signal received on terminal 293 is inverted to a one signal by inverter 305, so AND/NOT 307 produces a zero signal which is applied to terminal H of OR 329. Terminal K of AND/NOT 309 has a one signal applied thereto as the zero signal received on terminal 240 is inverted to a one signal by inverter 327 and applied to that terminal. AND/NOT 309 therefore applies a zero signal to terminal K of OR 329, so that OR 329 applies a zero signal to terminal J of AND/NOT 331.

AND/NOT 331 therefore passes the positive pulses from the pulse generator 337 which are produced as the cage begins to move upwards. The positive pulses produced by pulse generator 337 are applied to terminal F of AND/NOT 337, produced as negative pulses by AND/NOT 331, inverted back to positive pulses by inverter 347, and applied to terminal X of OR 349. The positive pulses produced by pulse generator 337 are approximately 6 milliseconds in width, the actual width depending on the speed of the hoist motor.

Terminal R of AND/NOT 311 receives a zero signal from terminal 297 as the cage is not on level, terminal T receives a zero signal from inverter 323 as the cage is above level, and terminal U has previously received a zero signal from inverter 325 as terminal 220 has received a hoist signal. AND/NOT 311 therefore produces a one signal which is passed by OR 333, inverted by inverter 334 to a zero signal and applied to terminal U of AND/NOT 335. AND/NOT 335 is therefore also conditioned to pass the positive pulses from pulse generator 337, at the same time that the positive pulses are passed by AND/NOT 331. AND/NOT 335 produces a negative pulse for every positive pulse applied to terminal R which is applied to terminal F of one shot 355. In response to the negative going side of the negative pulse applied to terminal F, one shot 355 produces a negative pulse from terminal E having a width of 3 milliseconds. The negative pulse from terminal E of one shot 355 is applied to terminal X of one shot 357, and at the end of 3 milliseconds, the negative pulse goes positive. One shot 357 produces a negative pulse having a width of 15 microseconds from terminal P on the positive going side of the negative signal applied to terminal X. The negative 15 microsecond pulse produced by one shot 357 is thus applied to terminal Y of OR 349. 3 milliseconds after the application of the positive pulse from inverter 347. The positive pulse from inverter 347 has already been delivered on terminal 259 to the primary counter in FIG. 6 to reduce the count in that counter by one. The application of a negative pulse to OR 349 in the middle of the positive pulse will create a second positive pulse as shown in FIG. 10 which will also be delivered on terminal 259 to the primary counter in FIG. 6 to reduce the primary counter by a further count of one.

Thus, for every one pulse from pulse generator 337, two pulses are delivered from terminal 259 to reduce the primary counter by a count of two.

At the same time the count in the jog counter should be reduced. The cage is not on level, so that the zero signal received on terminal 297 is inverted to a one signal by inverter 317 and applied to terminal N of AND/NOT 319, causing AND/NOT 319 to apply a zero signal to terminal M of AND/NOT 339. AND/NOT 39 therefore passes the positive pulses from the pulse generator 337 and delivers positive pulses on output terminal 343 to the input of the jog counter in FIG. 9 to reduce the count therein as a zero signal has been applied to the counter reverse terminal 293.

The application of two positive pulses to the primary counter in FIG. 6 from terminal 259 in FIG. 8 continues and the application of pulses to the jog counter in FIG. 9 continues. The count in the primary counter is reduced at twice the normal rate. When the jog counter has been reduced back to zero, all counter bits 361–369 are reset to ZERO, applying zero signals to both terminals of AND/NOT 377. AND/NOT 377 then produces a one signal which is delivered on terminal 299 to terminal 297 in FIG. 8, applying a one signal to terminal R of AND/NOT 311. AND/NOT 311 then stops producing a one signal and produces a zero signal which is inverted to a one signal by inverter 334 and applied to terminal U of AND/NOT 335. AND/NOT 335, with a one signal applied to one of its terminals, will no longer pass a positive pulse from pulse generator 337; and consequently, one shot 357 will not apply a negative pulse to OR 349 to divide the positive pulse applied to the primary counter into two positive pulses. Therefore, the primary counter will continue to count down the count therein, but at the normal rate.

Thus, after the jog counter has been reduced back to zero after a jog-up operation, the primary counter will count down at a normal rate during its upward movement.

What has happened is that the cage was a certain count above the level when an upward movement was called for. Therefore, when the count representing the upward movement was set into the primary counter, this count did not actually represent the distance to travel. Therefore the count in the primary counter must be reduced by the count in the jog counter to actually represent the distance that the cage must travel to reach the selected level. This subtraction has been accomplished by reducing the primary counter two times instead of one as the jog counter is reduced. When the jog counter has been reduced to zero, the normal rate of reduction may be restored.

For instance, assume that the cage has been jogged 100 counts above a level, and that the next trip of the cage is to travel upwards for a count of 1000. The actual trip from the actual position of 100 counts above the level is only 900 counts due to the jog position. Therefore, as the cage begins its trip, the jog counter is reduced one count at a time, and the primary counter is reduced two counts for every one count that the jog counter is reduced. When the jog counter has been reduced to zero, the primary counter has been reduced to a count of 800. The cage has traveled a count of 100 upwards from its intial jog position of 900, so that it is at a count of 800, as indicated in the primary counter.

The operation of the lower motion after a jog-up operation is different. The jog counter in FIG. 9 has counted the number of pulses as the hoist motor moves the cage upwards. The jog-up must be taken into account when the cage makes its next trip to another level. This time the next trip will be down, rather than up, as has just been described. The level to which the cage is to be moved is selected in the same manner as that described in the description of the normal operation. A count is set in the primary counter shown in FIG. 6, indicating the distance that the trip will take from the present level to the selected level.

For a lower operation, a signal is applied by OR circuit 236 to energize the lower relay coil 239 to start the hoist motor to move the cage down. The signal from OR circuit 236 is also delivered on output terminal 237 to terminal 240 in FIG. 8.

The one signal received on terminal 240 in FIG. 8 is applied to terminal Y of AND/NOT 318, causing AND/NOT 318 to apply a zero signal to AND/NOT's 321, 315, 319, 335, and 331, conditioning these AND/NOT's. The cage is not on level, so a zero signal is received on terminal 297 and applied to AND/NOT's 309, 311, and 321. The cage is above level, so a one signal is received on terminal 301, inverted to a zero signal by inverter 323 and applied to AND/NOT's 309, 311, and 321. AND/NOT 321 therefore produces a one signal which is inverted by inverting OR 287 to a zero signal and delivered on output terminal 291 to terminal 293 in FIG. 9. In FIG. 9 the zero signal received on terminal 293 is applied to the STR (count reverse) terminal of the counter bits 361–369 of the jog counter so that the jog counter will count in reverse when positive pulses are applied to the PR terminal of the first counter bit 361. The jog counter has counted up as the cage was moved up above the level and must now count back down to zero.

AND/NOT 307 produces a zero signal which is applied to terminal H of OR 329 as described for the upward motion. It has been described how terminal F and H of AND/NOT 309 receive zero signals, and the one signal received on the lower terminal 240 is inverted by inverter 327 and applied as a zero signal to terminal U of AND/NOT 309. AND/NOT 309 therefore produces a one signal which is passed by OR 329 and applied to terminal I of AND/NOT 331, keeping AND/NOT 331 from passing pulses from pulse generator 337 to the primary counter.

The zero signal received on terminal 297 inverted by inverter 317, and applied to terminal N of AND/NOT 319, causing AND/NOT 319 to apply a zero signal to terminal H of AND/NOT 339. AND/NOT 339 therefore is conditioned to pass the pulse from the pulse generator 337 as the cage moves downward to the jog counter in FIG. 9 to reduce the count in the jog counter.

As the cage moves down, the count in the jog counter is reduced accordingly. When the cage reaches the level at which it started from, the jog counter in FIG. 9 has counted down to zero, with all counter bits reset to ZERO. Zero signals are applied to all terminals of AND/NOT 277, causing AND/NOT 277 to deliver an "on level" one signal from terminal 299 to terminal 297 in FIG. 8. The one signal received on terminal 297 is inverted by inverter 317 and applied as a zero signal to terminal N of AND/NOT 319. AND/NOT 319 has a zero signal applied to its other terminal at this time, so that it applies a one signal to terminal H of AND/NOT 339, blocking AND/NOT 339 from passing any more pulses from pulse generator 337 to the jog counter in FIG. 9. The jog counter therefore quits counting when the cage reaches the level from which it started before the job operation.

The one signal received on terminal 297 is applied to terminal F of AND/NOT 309 causing AND/NOT 309 to apply a zero signal to terminal K of OR 329, so that OR 329 applies a zero signal to terminal J of AND/NOT 331. AND/NOT 331 therefore starts to pass pulses from the pulse generator 337 to the primary counter to reduce the count in the primary counter as the cage moves downward from the initial level to the selected level as described hereinbefore. As soon as the cage moves below the level, a zero signal is received on terminal 301, inverted to a one signal by inverter 323, and applied to terminal H of AND/NOT 309 to keep AND/NOT producing a zero signal to keep AND/NOT 331 conditioned to keep passing pulses from pulse generator 337 to the primary counter.

The rest of the operation has been described before for the normal operation.

The operation for the hoist and lower operation when the cage has been jogged below a level is similar to that already described when the cage has been jogged above a level. The operation is reversed with double pulsing occurring when the cage has been jogged below the level, and a subsequent lower operation is called for and no pulses until the jog counter has been reduced to zero when a subsequent hoist operation is called for.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In a mine hoist system for moving a conveyance in a mine shaft or hoisting slope including means for initiating the movement of the conveyance away from a level, first counting means responsive to the movement of the conveyance for accumulating a jogging count proportional to the distance that the conveyance is jogged away from a level, means for indicating the trip the conveyance is to take between two levels, second counting means, means responsive to said indicating means for setting a count in said second counting means indicating the distance the conveyance will travel between the two levels, and means responsive to the movement of the conveyance between two levels and to the jogging count in said first counting means for reducing the count in said second counting means at rates dependent upon the jogging count in said first counting means.

2. In a mine hoist system for moving a conveyance from one level to another level in a mine shaft or on a hoisting slope, means for initiating the movement of the conveyance away from a level, first counting means responsive to the movement of the conveyance for accumulating a jogging count proportional to the distance that the conveyance is jogged away from a level, means for indicating the trip that the conveyance is to take between two levels, second counting means responsive to said indicating means for establishing a count proportional to the distance that conveyance will travel between the two levels, and means responsive to the movement of the conveyance between two levels for reducing the count in said first counting means at a movement-dependent rate and in said second counting means at a rate dependent upon the jogging count in said first counting means.

3. In a mine hoist system for moving a conveyance from one level to another level in a mine shaft or on a hoisting slope including means for initiating the movement of the conveyance away from a level, first counting means responsive to the movement of the conveyance for accumulating a jogging count proportional to the distance that the conveyance is jogged away from a level, means for indicating the trip that the conveyance is to take between two levels, second counting means responsive to said indicating means for setting a count in said second counting means proportional to the distance that the conveyance will travel between the two levels, means responsive to the movement of the conveyance between the two levels for reducing the count in said first and second counting means in accordance with the movement of the conveyance, and means for modifying said reducing means to reduce the count in said second counting means at twice the normal rate when the conveyance has been jogged in the direction that the trip is to take until said first counting means has been returned to normal and to inhibit the reduction of the count in said second counting means when the conveyance has been jogged away from the direction that the trip is to take until the count in said first counting means has been reduced to zero.

4. In a mine hoist system for moving a conveyance from one level to another level in a mine shaft or on a hoisting slope including means for initiating the movement of the conveyance away from a level, reversing counting means responsive to the movement of the conveyance for counting up when the conveyance moves up from a level and counting down when the conveyance moves down from a level to indicate the distance that the conveyance moves away from a level, means for indicating the trip that the conveyance is to take between two levels, second counting means responsive to said indicating means for setting a count proportional to the distance that the conveyance will travel between the two levels, means responsive to the movement of said conveyance between the two levels for reducing the count in said reversing and second counting means in accordance with the movement of the conveyance, and means for modifying said reducing means to reduce the count in said second counting means at twice the normal rate when the conveyance has been moved in the direction that the trip is to take until said reversing counting means has been reduced to zero and to inhibit the reduction of the count in said counting means when the conveyance has been moved away from the direction that the trip is to take until said reversing counting means has been reduced to zero.

References Cited

UNITED STATES PATENTS

| | | | |
|---|---|---|---|
| 2,959,074 | 11/1960 | Hallahan | 318—20.320 X |
| 3,218,532 | 11/1965 | Toscano | 318—20.320 X |
| 3,323,030 | 5/1967 | Inaba et al. | 318—20.320 X |

ORIS L. RADER, *Primary Examiner.*

THOMAS LYNCH, *Examiner.*